March 10, 1970     C. E. MALONE     3,499,244
LIVE BAIT RECEPTACLE AND TACKLE BOX
Filed April 8, 1968

CARNEY E. MALONE
INVENTOR.

BY Charles E. Lightfoot
ATTORNEY

United States Patent Office 3,499,244
Patented Mar. 10, 1970

3,499,244
LIVE BAIT RECEPTACLE AND TACKLE BOX
Carney E. Malone, 1209 E. Sunnyside,
Houston, Tex. 77022
Filed Apr. 8, 1968, Ser. No. 719,603
Int. Cl. A01k 97/04
U.S. Cl. 43—56                                                2 Claims

ABSTRACT OF THE DISCLOSURE

A live bait receptacle having an outer bucket and a removable inner, foraminated, floating bait holder. The foraminated holder has a closed bottom adapted to retain water sufficient to allow the transfer of the holder from the water in the bucket to the water in the fishing area while maintaining the bait in a live condition. The bucket also has a removable cover in the form of a compartmental tackle box shaped for coaction with the inner bait holder to prevent the same from floating in the bucket. The bucket is provided with air inlet openings adjacent its upper end positioned to allow access of air to the water in the bucket.

BACKGROUND OF THE INVENTION

Live bait receptacles of the bucket type have been commonly provided heretofore which are provided with an inner foraminated holder or container for holding live bait and which may be lifted out of the bucket and submerged in the water at the fishing grounds to keep the bait in a live and active condition. The inner holder or container in live bait receptacles of this type, however, are not usually adapted to float, so that they sink immediately and are heavy and cumbersome to retrieve when the bait is needed. Moreover, foraminated containers of this kind are not ordinarily provided with means for retaining water for the bait while the container is being transferred.

In bait receptacles of this kind it is also necesasry to provide means for supplying air to the water in the bucket during the time that the foraminated holder is in the bucket, or to provide some means of supplying oxygen to the bait.

The present invention has for an important object the provision of a live bait receptacle which may be used for the transportation of live bait and embodying bait holding means which may be floated in the water at the fishing location to keep the bait in good condition.

The invention also contemplates the provision of a combined line bait bucket and tackle box in which the tackle box serves as a cover or lid for the bucket and to retain the foraminated holder in a submerged condition in the bucket.

The construction and advantages of the invention may best be understood from the following detailed description of the same when considered with the annexed drawings illustrating a preferred embodiment of the invention.

SUMMARY OF THE INVENTION

The bait receptacle of the invention comprises an outer bucket having an open top and provided at its upper end with openings in its side wall for the ingress of air; a foraminated inner container or holder adapted to be inserted in and removable from the bucket and having a tray-like bottom adapted to hold a certain amount of water in the holder, and buoyant means on the holder located above the bottom of the same to cause the holder to float in an upright condition in the water.

The invention also includes a removable cover for the bucket, which is hollow and adapted to serve as a tackle box, and which is of a shape to extend downwardly into the bucket for engagement wtih the inner holder to limit the upward floating movement of the holder in the bucket.

DETAILED DESCRIPTION OF THE INVENTION

Figure 1:
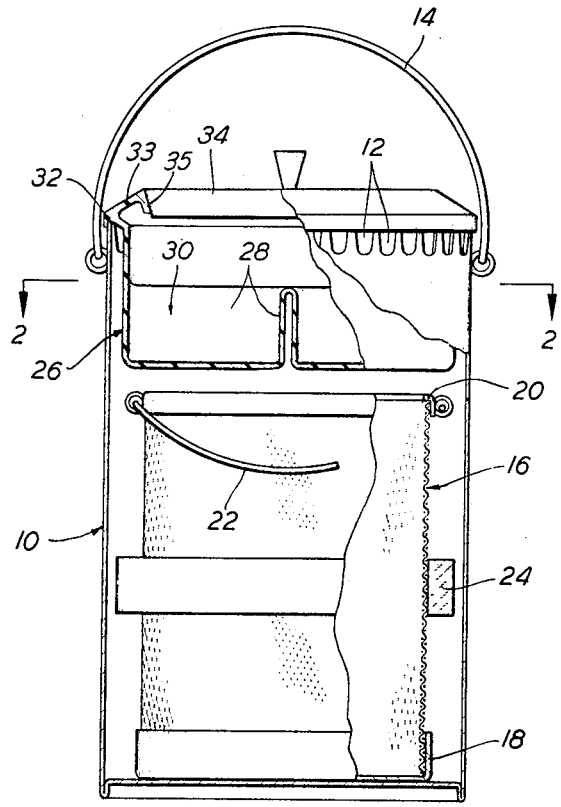
FIGURE 1 is a side elevational view, partly broken away and partly in vertical, central cross section showing the foraminated holder in position in the bucket with the tackle-box lid in place.

The bait receptacle and tackle box of the invention comprises an outer bucket 10, which is preferably of cylindrical shape, whose upper end is open and which is formed with upwardly opening notches 12 around its rim through which air may enter the bucket from the exterior when the upper end of the bucket is covered. The bucket 10, may be provided with the usual bail 14 carrying the same about.

An inner, foraminated, cylindrical holder or container 16 is provided for insertion in and removal from the bucket, which holder may be formed of mesh-like material, such as wire screen, and which is provided with a tray-like bottom 18 of sheet metal, or the like, of a depth to assure that a sufficient amount of water will be retained therein to keep the live bait in good condition while the holder is being transferred from the bucket to some body of water or is being returned therefrom to the bucket.

At its upper end the holder may be provided with an annular rim element 20 for the pivotal attachment thereto of a bail 22, by which the holder may be carried and which is of a size to be moved to a lowered position, shown in FIGURE 1, when the holder is in the bucket.

Figure 2:
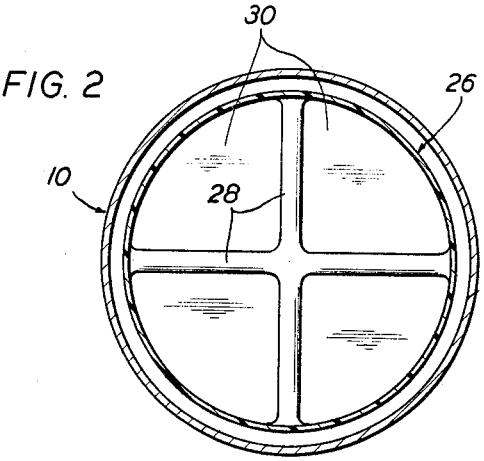
FIGURE 2 is a cross-sectional view, taken along the line 2—2 of FIGURE 1, looking in the direction indicated by the arrows.

A buoyant member or float 24 is attached exteriorily to the holder at a location spaced above the bottom thereof to cause the holder to float in an upright condition in the water, as seen in FIGURE 2, which float may take the form of a hollow ring, or may be formed of foam plastic or the like. The float or ring 24 is of somewhat smaller outside diameter than the diameter of the bucket to allow the holder to be easily inserted in the bucket, and may serve as a spacer or centrallizer for the holder.

A lid or cover, generally designated 26 is provided for the bucket, which takes the form of a round hollow box formed with inner partitions 28 extending upwardly from its bottom to form compartments 30 therein in which any desired objects, such as articles of fishing tackle may be placed. The cover 26 has an upper, external, annular, radially extending rim portion 32 which fits over the upper end of the bucket to support the cover on the bucket leaving the openings provided by the notches 12 open, and the cover also has a removable lid 34. The cover is also formed with a radially inwardly extending, annular, rim portion 33 having an annular, beveled face 35 with which the lid 34 is engageable to close the cover, as seen in FIGURE 1, and which inwardly extending rim portion serves as a convenient means for lifting the cover off of the as a convenient means for lifting the cover off of the bucket. The cover 26 may be of a depth to extend downwardly in the bucket for a distance to coact with the holder 16 to limit the upward floating of the holder in the bucket so that the water level in the holder will be high enough to keep the bait well submerged.

The cover is of a size to be spaced radially inwardly from the bucket when in place thereon to permit free access of air from the exterior to the water in the bucket through the notches 12.

Figure 3:
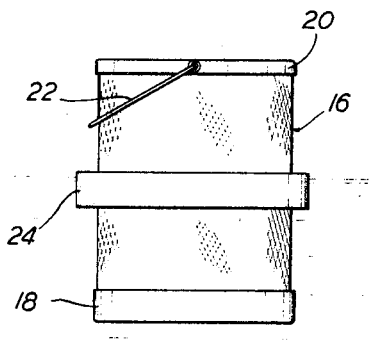
FIGURE 3 is a side elevational view, on a somewhat reduced scale, showing the inner foraminated bait holder removed from the bucket and in a floating position in the water.

In using the bait receptacle, live bait, such as minnows, shrimp, or the like is placed in the foraminated holder in the bucket which has first been supplied with water to a suitable level. The cover 26, containing any desired articles of fishing tackle or other objects is then placed in position, whereupon the bucket may be carried to the fishing location or placed in a boat well for transportation. Upon reaching the fishing ground, the cover 26 is lifted off and the holder lifted out of the bucket and lowered into the water to float therein, as seen in FIGURE 3, the holder being suitably tethered to prevent its floating away.

Live bait may be removed from the holder through its open upper end, and it is to be noted that due to the upright floating of the holder, with its upper portion extending above the water level, live bait, such as minnows, will be prevented from leaping out or swimming away, such as might take place if the holder were to be completely submerged.

During the transfer of the holder from the bucket to the water or in returning the same to the bucket, sufficient water will be retained in the tray-like bottom 18 to keep the bait submerged.

It will be thus be apparent that the invention provides a combined live bait receptacle and tackle box, which is of simple design and rugged construction, and in which the bait may be kept in good condition and is readily accessible at all times.

The invention is disclosed herein in connection with a particular embodiment of the same, which is intended by way of illustration only, it being apparent that various changes can be made in the construction and arrangement of the parts within the spirit of the invention.

Having thus clearly shown and described the invention, what is claimed as new and desired to secure by Letters Patent is:

1. In a combined live bait receptacle and tackle box,
   (a) an outer cylindrical bucket having peripherally upwardly opening notches in its upper end portion,
   (b) an inner foraminated container removably disposed in the bucket whose length is substantially less than that of the bucket,
   (c) an annular float surrounding and attached to the container at a location substantially below its upper edge to cause the container to float in an upright position in water with an upper portion of the container extending above the water level, and whose outer diameter is substantially smaller than the diameter of said bucket,
   (d) a tray-like imperforate bottom on the container having an upwardly extending wall extending continuously about the periphery of the container in position to hold water therein when the container is out of the water,
   (e) a hollow, annular cover for the bucket having a closed bottom and whose upper end is open and having an annular side wall whose diameter is substantially less than the diameter of the bucket, said cover having an external, annular rim at its upper end position for engagement with the upper end of the bucket to support the cover in the bucket to close the bucket with the bottom of the cover positioned for coaction with said container to limit upward floating movement of the container in the bucket and with said side wall spaced radially inwardly from the bucket to form a passageway for the flow of air into and out of the bucket through said notches.

2. The combined live bait receptacle and tackle box as claimed in claim 1, wherein said cover is formed at its upper end with annular rim portion extending radially inwardly from said side wall, and including
   (f) a removable lid engageable with said inwardly extending rim portion to close the cover.

References Cited

UNITED STATES PATENTS

| | | | |
|---|---|---|---|
| 724,539 | 4/1903 | Bourne | 43—56 X |
| 821,040 | 5/1906 | Jones | 43—56 |
| 2,179,095 | 11/1939 | Kelsey | 43—56 |
| 2,595,726 | 5/1952 | Swanbeck | 43—56 |
| 2,613,843 | 10/1952 | Suda | 43—56 X |
| 2,674,825 | 4/1954 | Rice | 43—56 |

WARNER H. CAMP, Primary Examiner